US011722464B2

(12) United States Patent
Sivaraman et al.

(10) Patent No.: US 11,722,464 B2
(45) Date of Patent: Aug. 8, 2023

(54) SYMMETRIC ACCOUNT AUTHENTICATION

(71) Applicant: VMware, Inc., Palo Alto, CA (US)

(72) Inventors: Hari Sivaraman, Livermore, CA (US); Uday Kurkure, Los Altos Hills, CA (US); Lan Vu, San Jose, CA (US); Vijayaraghavan Soundararajan, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 807 days.

(21) Appl. No.: 16/288,453

(22) Filed: Feb. 28, 2019

(65) Prior Publication Data
US 2020/0280544 A1 Sep. 3, 2020

(51) Int. Cl.
*H04L 29/06* (2006.01)
*H04L 9/40* (2022.01)

(52) U.S. Cl.
CPC .......... *H04L 63/0435* (2013.01); *H04L 63/06* (2013.01); *H04L 63/08* (2013.01)

(58) Field of Classification Search
CPC ...... H04L 63/0435; H04L 63/06; H04L 63/08
See application file for complete search history.

(56) References Cited

U.S. PATENT DOCUMENTS

| | | | | |
|---|---|---|---|---|
| 2,028,820 | A * | 1/1936 | Bethurum | A01N 1/00 27/25.1 |
| 6,266,413 | B1 * | 7/2001 | Shefi | H04L 9/0662 380/278 |
| 6,618,697 | B1 * | 9/2003 | Kantrowitz | G06F 40/232 703/2 |
| 2003/0084291 | A1 * | 5/2003 | Yamamoto | H04L 63/0823 713/168 |
| 2005/0027989 | A1 * | 2/2005 | Sandhu | H04L 63/083 713/182 |
| 2005/0262022 | A1 * | 11/2005 | Oliveira | G06F 21/10 705/51 |

(Continued)

OTHER PUBLICATIONS

Olivier Pereira et al., Leakage-Resilient Authentication and Encryption from Symmetric Cryptographic Primitives, Oct. 12, 2015, ACM, pp. 96-108. (Year: 2015).*

(Continued)

*Primary Examiner* — Kari L Schmidt
*Assistant Examiner* — Fahimeh Mohammadi
(74) *Attorney, Agent, or Firm* — Patterson + Sheridan, LLP

(57) ABSTRACT

A method for symmetric authentication is provided. This method includes generating a first challenge message containing a first string; encrypting the first challenge message; transmitting the encrypted first challenge message to a second device; receiving a first answer message from the second device; decrypting the first answer message; and authenticating the second device based on determining the decrypted first answer message contains the first string. Upon successful authentication of the second device, the method further includes receiving an encrypted second challenge message from the second device; decrypting the encrypted second challenge message; generating a second answer message containing a second string; encrypting the second answer message; and transmitting the encrypted second answer message to the second device.

19 Claims, 5 Drawing Sheets

(56) References Cited

U.S. PATENT DOCUMENTS

| | | | | |
|---|---|---|---|---|
| 2006/0128502 A1* | 6/2006 | Imamoto | ............ | A63B 53/0466 |
| | | | | 473/345 |
| 2006/0129502 A1* | 6/2006 | Pastusiak | ................ | G06F 21/10 |
| | | | | 705/71 |
| 2008/0034216 A1* | 2/2008 | Law | ...................... | H04L 9/3273 |
| | | | | 713/183 |
| 2009/0022309 A1* | 1/2009 | Vanstone | .............. | G06F 40/151 |
| | | | | 380/28 |
| 2011/0219427 A1* | 9/2011 | Hito | ........................ | H04L 63/18 |
| | | | | 726/3 |
| 2012/0288092 A1* | 11/2012 | Cakulev | .................. | H04L 63/30 |
| | | | | 380/255 |
| 2015/0372811 A1* | 12/2015 | Le Saint | ............... | H04L 63/068 |
| | | | | 705/76 |
| 2016/0055606 A1* | 2/2016 | Petrovic | ............. | H04N 21/8358 |
| | | | | 382/100 |
| 2020/0211004 A1* | 7/2020 | Ng | ..................... | G06Q 20/4097 |
| 2020/0244636 A1* | 7/2020 | Varanasi | ................. | H04L 63/08 |

OTHER PUBLICATIONS

Dongsheng Wang et al., Generalized Pattern Matching String Search on Encrypted Data in Cloud Systems, Aug. 24, 2015, IEEE, pp. 2101-2109. (Year: 2015).*

Xianru Du et al., Physical Layer Challenge-Response Authentication in Wireless Networks with Relay, Jul. 8, 2014, IEEE, pp. 1-9. (Year: 2014).*

Khaing Khaing Thinn, Three way Challenge-Response authentication in smart card Using Elliptic Curve Cryptosystem, Mar. 16, 2009, IEEE, pp. 777-780. (Year: 2009).*

* cited by examiner

SYMMETRIC ACCOUNT AUTHENTICATION

BACKGROUND

Computer systems are typically configured with authentication mechanisms that protect data in the computer system from being accessed by unauthorized users. In particular, computer systems, such as operated by companies, institutions, etc., often store sensitive user data, and access to such data is protected by authentication mechanisms. For example, a user may access a computer system over a network (e.g., the Internet) using a remote computing device in order to access the user's data. The computer system often requires a login process whereby the user presents valid login credentials such as a username and a password, key, etc., to the computer system so that the computer system can verify the user as authentic before granting access to the user's data. While this asymmetric authentication provides a mechanism to prevent access to the computer system without valid login credentials, thereby providing some security to the user's data, such asymmetric authentication does not prevent all vectors of attack. For example, such asymmetric authentication mechanisms do not protect end users from phishing attacks, which target unknowing and unsuspecting end users. Oftentimes, phishing attacks redirect users to fake websites, which imitate the look and feel of a legitimate website of a company or institution, and instruct users to provide personal information. Phishing relies on the users believing that the fake website is a legitimate website of the company or institution. The user then provides valid login credentials to the attacker, which the attacker can then use to access the user's data on the legitimate computer system. Accordingly, current computer systems may not protect end users, such as from imposter websites.

DETAILED DESCRIPTION

Figure 1:
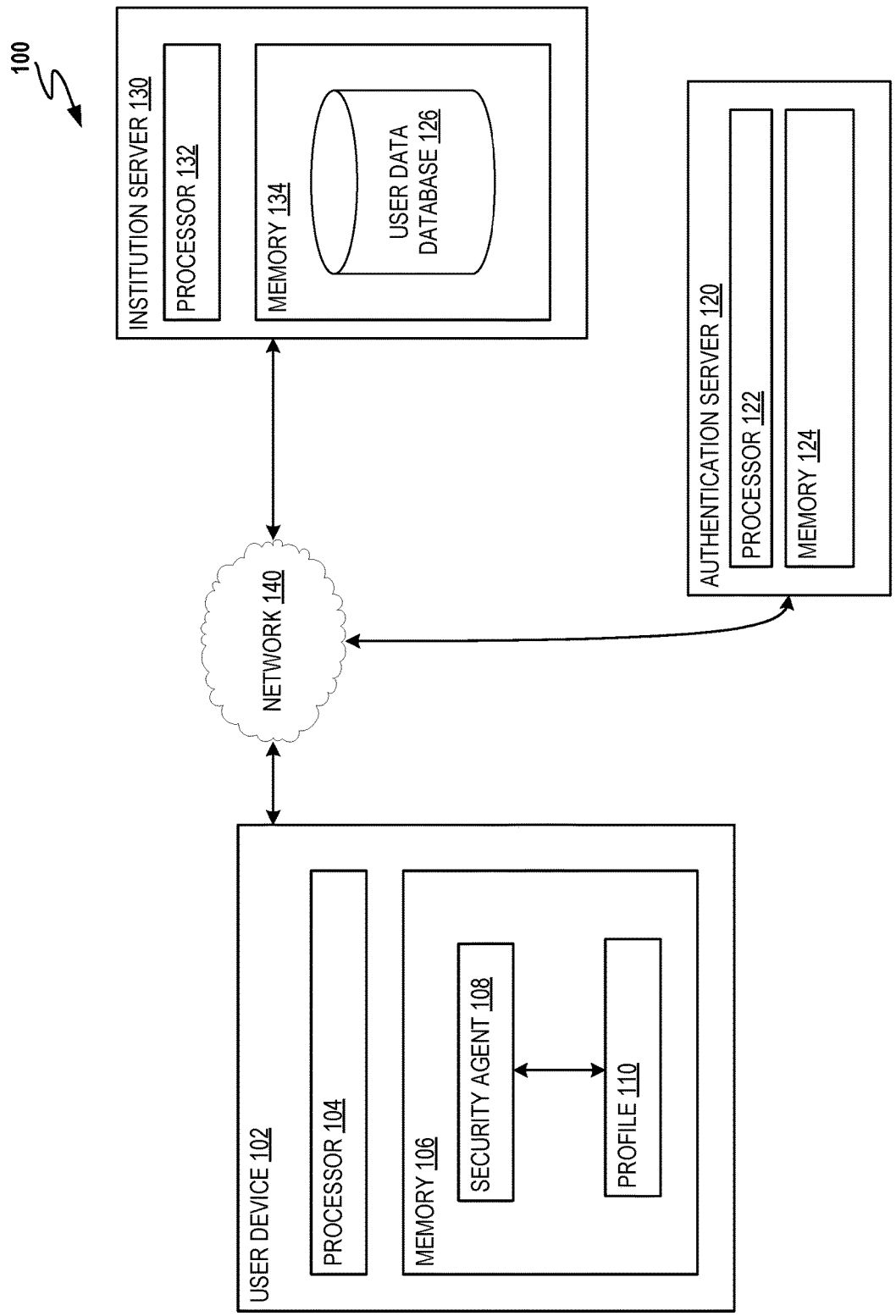
FIG. 1 illustrates components of an example system in which an embodiment may be implemented.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments herein describe methods and systems for symmetric authentication. In certain cases, such symmetric authentication may provide improved security for computer systems, such as resistance to phishing. In one embodiment, symmetric authentication can be used for authentication to access other computer systems, such as through access portals and websites. For example, when a user account is created corresponding to a website hosted by an institution or an institution server, the institution server creates a pair of keys unique to the user account, and both the institution server and a user device associated with the user creating the user account store the pair of keys. Whenever the user logins into the institution's website using a computing device (e.g., the same or different than the user device), the institution server generates and transmits a challenge message encrypted with a first key of the pair of keys created during account creation to the user device. The challenge message includes a string of information, typically a string of characters forming a sentence. The user device receives the challenge message, decrypts the challenge message using its copy of the same key, and replies to the institution server using an answer message comprising the string of information encrypted with the second key of the pair of keys. The user device also generates and transmits a challenge message encrypted with the second key of the pair of keys, the challenge message comprising a different string of information. The institution server receives the user device's challenge message, decrypts the challenge message using the second key, and replies to the user device using another answer message comprising the different string of information encrypted with the first key of the pair of keys.

With both sides issuing challenges and answers, the user device and the institution server engage in symmetric (two-sided) authentication, in which the institution server authenticates the user via the user device and the user device authenticates the institution server to the user. Such symmetric authentication provides resistance against phishing attacks because both parties (user and institution) have verified each other as authentic using challenges and answers encrypted with keys only known to the parties.

FIG. 1 illustrates components of an example security system in which an embodiment of symmetric authentication may be implemented. As shown, security system 100 includes a user device 102, an authentication server 120, an institution server 130, and a network 140. Though these components are shown, it should be noted that there may be any number of components (e.g., user devices) in the system 100.

In certain embodiments, user device 102 communicates with authentication server 120 and institution server 130 via a computer network 140. In certain embodiments, user device 102 allows end users to access services and resources of institution server 130 via computer network 140, and helps perform authentication for allowing such access. In certain embodiments, end users can access services and resources of institution server 130 via another computing device (not shown), while user device 102 still helps perform authentication for allowing such access. The user device 102 comprises a processor 104 and memory 106, the memory 106 having a security agent 108 and a profile 110.

In some embodiments, user device 102 uses security agent 108 to access authentication server 120 and institution server 130, and in turn, security agent 108 utilizes information in profile 110 for accessing authentication server 120 and institution server 130. In such embodiments, profile 110 comprises user information related to institution server 130 and authentication server 120. In some embodiments, security agent 108 interacts with authentication server 120 or institution server 130 in order to facilitate symmetric authentication as disclosed herein, and can output a graphical user interface to a display device of user device 102 for such facilitation.

The user device 102 is a computing device such as a tablet, smartphone, laptop, workstation, etc. In some embodiments, the memory 106 is configured to store instructions for security agent 108, profile 110, and other components that when executed by processor 104, cause processor 104 to perform the operations illustrated in FIGS. 2-4, or other operations for performing the various techniques discussed below.

The institution server 130 communicates with user device 102 and authentication server 120 via computer network 140. In some embodiments, institution server 130 provides resources and services to user device 102, or another computing device, via a website that user device 102 or other computing device accesses through computer network 140, and needs secure techniques to ensure that user device 102 or other computing device is the correct and authentic recipient of its resources and services. In such embodiments, institution server 130 uses authentication server 120 to assist in authenticating the user device 102 or other computing device. The institution server 130 comprises a processor 132 and memory 134 having a user data database 126. In some embodiments, institution server 130 executes operations using processor 132 and institution server 130 stores the operations and the results in memory 134, including user data database 126. In some embodiments, institution server 130 may request operations to be performed on the database 126. In the present disclosure, institution server 130 is not limited to using the authentication server 120 for authentication purposes, and can utilize any currently available or later available security systems.

In some embodiments, user data database 126 includes any suitable non-volatile data store for organizing and storing data from user device 102, another computing device, or institution server 130. For example, in some embodiments, database 126 is implemented as software-defined storage such as VMware vSAN that clusters together server-attached hard disk drives and/or solid state drives (HDDs and/or SSDs), to create a flash-optimized, highly resilient shared datastore designed for virtual environments. In some embodiments, user data database 126 may be implemented as one or more storage devices, for example, one or more hard disk drives, flash memory modules, solid state disks, or optical disks (e.g., in a computing device, server, etc.). In some embodiments, user data database 126 may include a shared storage system having one or more storage arrays of any type such as a network-attached storage (NAS) or a block-based device over a storage area network (SAN).

Similarly, authentication server 120 communicates with user device 102 and institution server 130 via computer network 140. The authentication server 120 can comprise a processor 122 and memory 124. In some embodiments, authentication server 120 executes operation using processor 122 and authentication server 120 stores the operations and the results in memory 124. In one embodiment, authentication server 120 facilitates authentication of user device 102 or another computing device and institution server 130 to each other. In some embodiments, authentication server 120 can be a third-party service providing security and authentication services to institution server 130. In one embodiment, authentication server 120 is integrated with institution server 130 and thereby acts on behalf of institution server 130 in the symmetric authentication techniques disclosed herein. Further details about symmetric authentication are provided below.

In some embodiments, authentication server 120 and institution server 130 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. In some embodiments, authentication server 120 and institution server 130 may generate data that is loaded into user data database 126, and may request operations to be performed on user data database 126.

Figure 2:
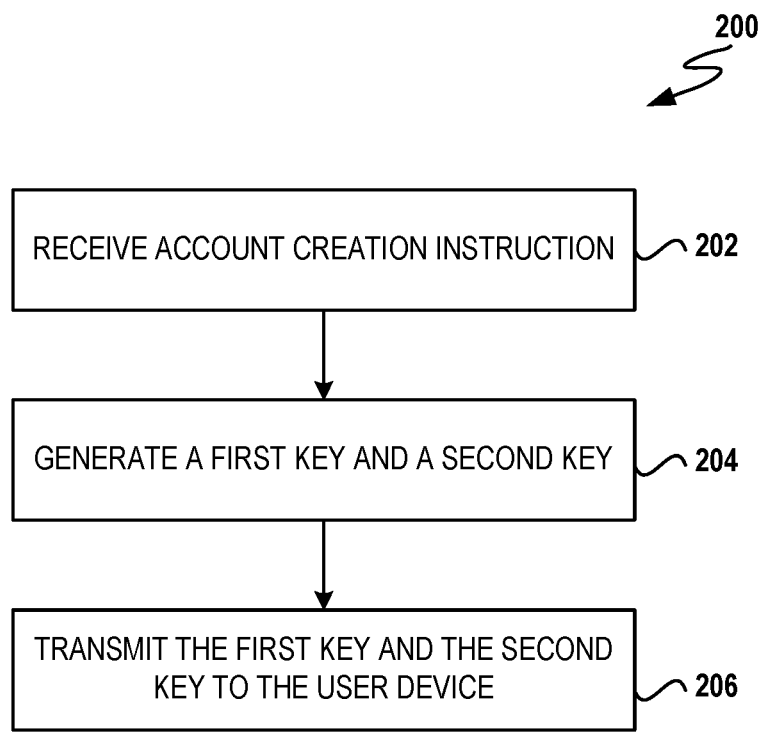
FIG. 2 depicts a flow diagram of example operations of a first device for creating a symmetric account, according to embodiments of the present disclosure.

FIG. 2 depicts a flow diagram of example operations of a first device for creating a symmetric account, according to embodiments of the present disclosure. In some embodiments, the first device may be an institution server (e.g., institution server 130). For a security system (e.g., security system 100) to permit symmetric authentication between a first device (e.g., institution server 130) and a second device (e.g., user device 102), the system facilitates account creation that utilizes symmetric authentication disclosed herein. It is assumed that the first device and the second device are authentic during account creation, for example, by verifying digital certificates or by verification by the user and institution at a physical location. For example, the user can go to a physical location of the institution to set up an account, so the institution can verify the user's identity using government-issued identification and the user can verify the institution's identity at the physical location. It is assumed that authentication server 120 has also verified and is in secure communication with each of institution server 130 and user device 102. The authentication server 120 further provides a private key associated with the authentication server 120 to each of institution server 130 and user device 102 using the secure communication. Accordingly, institution server 130 and user device 102 can use the private key for secure communication between one another. For example, one of the institution server 130 and user device 102 can encrypt communications with the public key of authentication server 120 associated with the private key. The receiving device then can decrypt the communications using the public key, as further discussed herein.

Operations 200 begin at step 202 with institution server 130 receiving an account creation instruction. In one embodiment, user device 102 or another computing device operated by the user of user device 102 transmits the account creation instruction. With the account creation instruction, institution server 130 can receive any type of information related to account creation (e.g., information about the user device 102, information about the user, username, password, etc.).

At step 204, operations 200 continue with institution server 130 generating a first key and a second key. In some embodiments, institution server 130 independently generates the first key and second key. In some embodiments, in response to receiving an account creation instruction, institution server 130 transmits instructions to authentication server 120 to generate a first key and a second key for user device 102 and receives the first key and second key from authentication server 120. In some embodiments, the first key and second key generated are unique to each user device 102, and can therefore identify user device 102 to institution server 130, and also prevent multiple user devices from having the same credentials. In some embodiments, the first key and the second key each comprise a sequence of alphanumeric characters used to encrypt a message using eXtended Tiny Encryption Algorithm (XTEA). The sequence of alphanumeric characters can have any length, and can contain any arrangement and combination of alphanumeric characters. In some embodiments, the first and second keys can comprise any sequence of computer-readable characters for encoding. In some embodiments, institution server 130 and/or authentication server 120 encrypts the first key and the second key using authentication server 120's public key. Accordingly, the encrypted first key and second key can only be decrypted using authentication server 120's private key. Each of user device 102 and institution server 130 securely receives the private key from the authentication server 120 for decrypting the encrypted first key and second key. In such embodiments, encrypting the first key and the second key with authentication server 120's public key allows for secure transfer of the first key and the second key to user device 102 (and optionally institution server 130) as other devices cannot decrypt the first key and the second key as they do not have the necessary private key. In some embodiments, institution server 130 generates one key for both institution server 130 and the user device 102 for encryption and use with the symmetric authentication process disclosed herein.

In one embodiment, institution server 130 also generates an account for the user. The account for the user includes user data that institution server 130 received with the account creation instruction. After generating the first key and the second key, institution server 130 stores the first key and the second key with the account information into user data database 126. Further details about the use of the first and second keys in symmetric authentication are provided below.

At step 206, operations 200 continue with institution server 130 transmitting the first key and the second key to user device 102. In some embodiments, institution server 130 transmits the encrypted first and second keys, as discussed. In some embodiments, institution server 130 directly transmits the first key and second key to user device 102. In some embodiments, prior to institution server 130 transmitting the first key and second key to user device 102, institution server 130 converts the first key and second key into a secondary format for transmission to user device 102. Secondary formats can include QR codes, text messaging, optical character readable (OCR) images, and other currently available technologies for securely transferring the first and second keys between devices. For example, institution server 130 may convert the first key and second key to a text message that user device 102 receives and extracts the first and second key from. In certain embodiments, institution server 130 converts the first key and second key for display on a graphical user interface of a computing device accessible by user device 102, such as a computing device other than user device 102 being used for account creation. For example, institution server 130 can convert the first and second keys into a QR code or OCR image and transmit graphic information corresponding to the QR code/OCR image to the computing device. The computing device is configured to display the received QR code/OCR image such as on a web page. A user uses user device 102 to scan the displayed QR code/OCR image, such as using a camera on user device 102, thereby completing transmission of the first and second keys to user device 102. The user device 102 further converts the QR code/OCR image back to the first and second keys. When the first key and second key are encrypted, user device 102 further decrypts the received copies of the first key and second key, encrypted using authentication server 120's public key, using a copy of authentication server 120's private key.

In one embodiment, user device 102 receives copies of the first key and second key via security agent 108 and stores the keys in profile 110. Once user device 102 receives the copies of the first and second key, user device 102 and institution server 130 can implement the symmetric authentication techniques disclosed herein.

Figure 3:
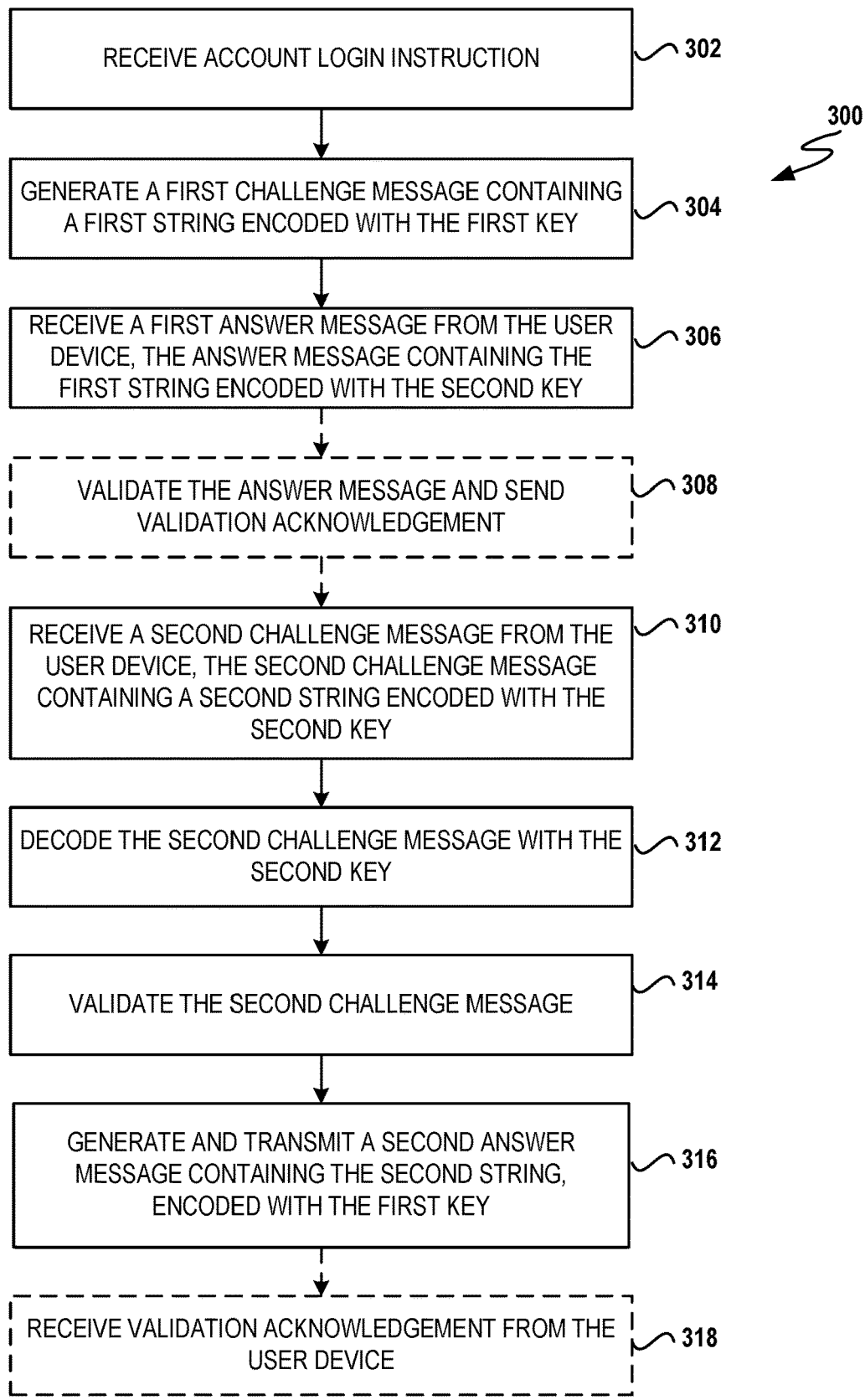
FIG. 3 depicts a flow diagram of example operations of a first device for symmetric account authentication, according to embodiments of the present disclosure.

FIG. 3 depicts a flow diagram of example operations of a first device for symmetric account authentication, according to embodiments of the present disclosure. In some embodiments, the first device may be an institution server (e.g., institution server 130). In such embodiments, operations 300 of FIG. 3 illustrate the institution server 130's side of the symmetric account authentication and thereby illustrate how institution server 130 authenticates user device 102.

Operations 300 begin at step 302 with institution server 130 receiving an account login instruction. In one embodiment, institution server 130 receives the account login instruction of the user from user device 102 or another computing device and proceeds with authenticating user device 102 or the other computing device via user device 102 for accessing the account of the user. The account login instruction can include any information needed to assist in institution server 130 performing the symmetric authentication.

At step 304, operations 300 continue with institution server 130 generating a first challenge message containing a first string encrypted with the first key. In order to authenticate user device 102 or the other computing device, institution server 130 generates a first challenge message comprising a first string. If user device 102 or other computing device is an authentic device as in it is authorized by the user, then user device 102 would be able to respond appropriately to the first challenge message by detecting the first string. The first challenge message can comprise multiple instances of the first string, and these instances can be reverse versions of the first string. The first challenge message can also include information about its structure, including the number of instances of the first string, whether a particular instance of the first string is reversed, etc. In one embodiment, the first challenge message's structure comprises the following: <N1, #, $B_1$, $B_2$, ... $B_{N1}$, #, $S1_1$, $S1_2$, ..., $S1_{N1}$> where S1 represents the first string, N1 is the integer indicating the number of instances of the first string, "#" is a separator symbol, $B_1$ is a single bit indicating whether a particular instance the first string is reversed. Accordingly, in such embodiments, the first challenge message comprises an integer indicating the number of instances of the first string, a separator symbol, multiple bits indicating the reversed state of the multiple instances of the first string, another separator symbol, and the multiple instances of the first string corresponding to the bits indicating the reverse states. An example challenge message's structure comprises <2, #, 0, 0, #, S1, S1>, and in such example challenge message, the first string appears twice and for both instances of the first string, the first string is not reversed. Including reversed versions of the first string adds extra security to the symmetric authentication process, in that once institution server 130 encrypts the first string, the first challenge message is random bits in a random order not necessarily corresponding to the original structure of the challenge message. Accordingly, attempting to derive the first string from the encrypted data is harder based on having repetitions and reversed versions.

In some embodiments, the first string comprises a sentence. The words of the sentence can be in any language. In one embodiment, the first string is a grammatically correct sentence. A grammatically correct sentence can further secure the symmetric authentication disclosed herein by providing an additional set of rules for validating the challenge message and for overall authentication. In another embodiment, the first string is a sentence retrieved from a computer network such as the Internet, or from publicly available information. For example, the institution server 130 can use a sentence from a book as the first string.

In some embodiments, institution server 130 encrypts the first challenge message using the first key of the pair of keys previously generated during account creation. In some embodiments, institution server 130 encrypts the first challenge message with the first key using the XTEA algorithm, or any other block encrypting algorithm. By having a longer challenge message, institution server 130 can provide more data for encryption and provide a more secure authentication process.

After generating the first challenge message, institution server 130 transmits the first challenge message to user device 102, such as using any of the methods discussed with respect to transmitting the keys at step 206 of FIG. 2.

On the user device 102 side of operations 300, once user device 102 receives the first challenge message from institution server 130, user device 102 processes the first challenge message and transmits a first answer message back to institution server 130. Details about user device 102 processing the first challenge message and generating the first answer message are provided below with respect to FIG. 4.

At step 306, operations 300 continue with institution server 130 receiving a first answer message from user device 102, such as via a network, the internet, text messaging, etc., the answer message containing the first string encrypts with the second key. Because institution server 130 and user device 102 have copies of the first and second keys, both institution server 130 and user device 102 can encrypts and decrypts the challenge messages and corresponding answer messages. Accordingly, if user device 102 has the correct first key and second key, user device 102 can decrypt the first challenge message and transmit a corresponding answer message containing the first string encrypted with the second key. If institution server 130 determines that the answer message is accurate, then institution server 130 would have authenticated user device 102. In one embodiment, institution server 130 uses the first key for any message to transmit to user device 102 and user device 102 uses second key for any message to transmit to institution server 130. In other embodiments, institution server 130 and user device 102 can use either of the keys to transmit messages to the other, so long as the other key is used when responding to the initial message. In some embodiments, if the answer message does not contain the first string, institution server 130 determines that the authentication fails and does not provide access to the user. In some embodiments, institution server 130 provides a different authentication process for the user after authentication failure based on the answer message not containing the first string (e.g., username and password-based authentication).

In some embodiments, at optional step 308, operations 300 continue with institution server 130 validating the first answer message and sending a first validation acknowledgement to user device 102, such as via a network, the internet, text messaging, etc. As illustrated in FIG. 3, the dotted lines of step 308 represent that institution server 130 can optionally perform step 308.

When institution server 130 validates the first answer message, institution server 130 decrypts the first answer message using the second key of the account corresponding to user device 102. If the results of decoding the first answer message with the second key match the first string used in generating the first challenge message, then institution server 130 has determined that user device 102 is authentic and does correspond to the correct user, and has thereby completed its side of the symmetric authentication process.

In some embodiments, whether or not institution server 130 has determined that user device 102 is authentic, institution server 130 transmits a first validation acknowledgement to the user device 102. The validation acknowledgement can include an acknowledgement message or any indication to user device 102 about the results of institution server 130's validation of the first answer message. In some embodiments, the acknowledgement can redirect user device 102 to the appropriate information, such as institution server 130's account management webpage.

When user device 102 receives the first validation acknowledgement from institution server 130, user device 102 determines that institution server 130 has authenticated user device 102. However, user device 102 has not authenticated institution server 130 and has not determined if institution server 130 is authentic. Accordingly, user device 102 transmits a second challenge message to institution server 130. Details about user device 102 generating the second challenge message are provided below with respect to FIG. 4.

At step 310, operations 300 continue with institution server 130 receiving a second challenge message from user device 102, the second challenge message containing a second string encrypted with the second key. Similar to the first challenge message, the second challenge message is encrypted with the second key that was generated during account creation. Further, the second challenge message may use a similar or same structure as the first challenge message. In certain aspects, there may not be a user at the institution server 130 side, so the second challenge message is transmitted directly to institution server 130, and not via a display of another device, such as via a network, the internet, text messaging, etc.

At step 312, operations 300 continue with institution server 130 decoding the second challenge message with the second key. The institution server 130 uses its copy of the second key to decrypted the second challenge message, and extracts the second string from the second challenge message.

At step 314, operations 300 continue with institution server 130 validating the second challenge message. In some embodiments, institution server 130 validates the second challenge message by verifying that each instance of the second string complies with its corresponding reverse state bit. If the second challenge message had been decrypted with information other than the second key, institution server 130 would decrypted the second string into a random sequence of ASCII symbols with no recognizable pattern. Accordingly, this random sequence would also not have the pattern described by the reverse state bits of the first challenge message. In some embodiments, institution server 130 validates the second challenge message by verifying that the second string complies with grammar rules (i.e., the second string is grammatically correct), spelling, and/or other language rules. In some embodiment, should the second string fail to comply with grammar rules, or any other verification rules, then institution server transmits a message to user device 102 about the second challenge message not complying with verification rules and requests that user device 102 resend the second challenge message.

At step 316, operations 300 continue with institution server 130 generating and transmitting a second answer message containing the second string decrypted with the first key to user device 102, such as using any of the methods discussed with respect to transmitting the keys at step 206 of FIG. 2. After decoding and validating the second challenge message, institution server 130 has extracted the second string from the second challenge message and generates the second answer message with the second string decrypted with the first key. The institution server 130 transmits the second answer message to user device 102.

In some embodiments, at optional step 318, operations 300 continue with institution server 130 receiving a second validation acknowledgement from the user device 102, such as via a network, the interne, text messaging, etc. Like with optional step 308, the dotted lines of step 318 represent that institution server 130 can optionally perform step 318. In some embodiments, whether or not user device 102 has determined that institution server 130 is authentic, user device 102 transmits a second validation acknowledgement to institution server 130, like the first validation acknowledgement sent from institution server 130 to user device 102.

When institution server 130 receives the second validation acknowledgement from user device 102, institution server 130 knows that user device 102 has authenticated institution server 130. Accordingly, because user device 102 and institution server 130 each know that the other is authentic, user device 102 and institution server 130 are symmetrically authenticated.

Figure 4:
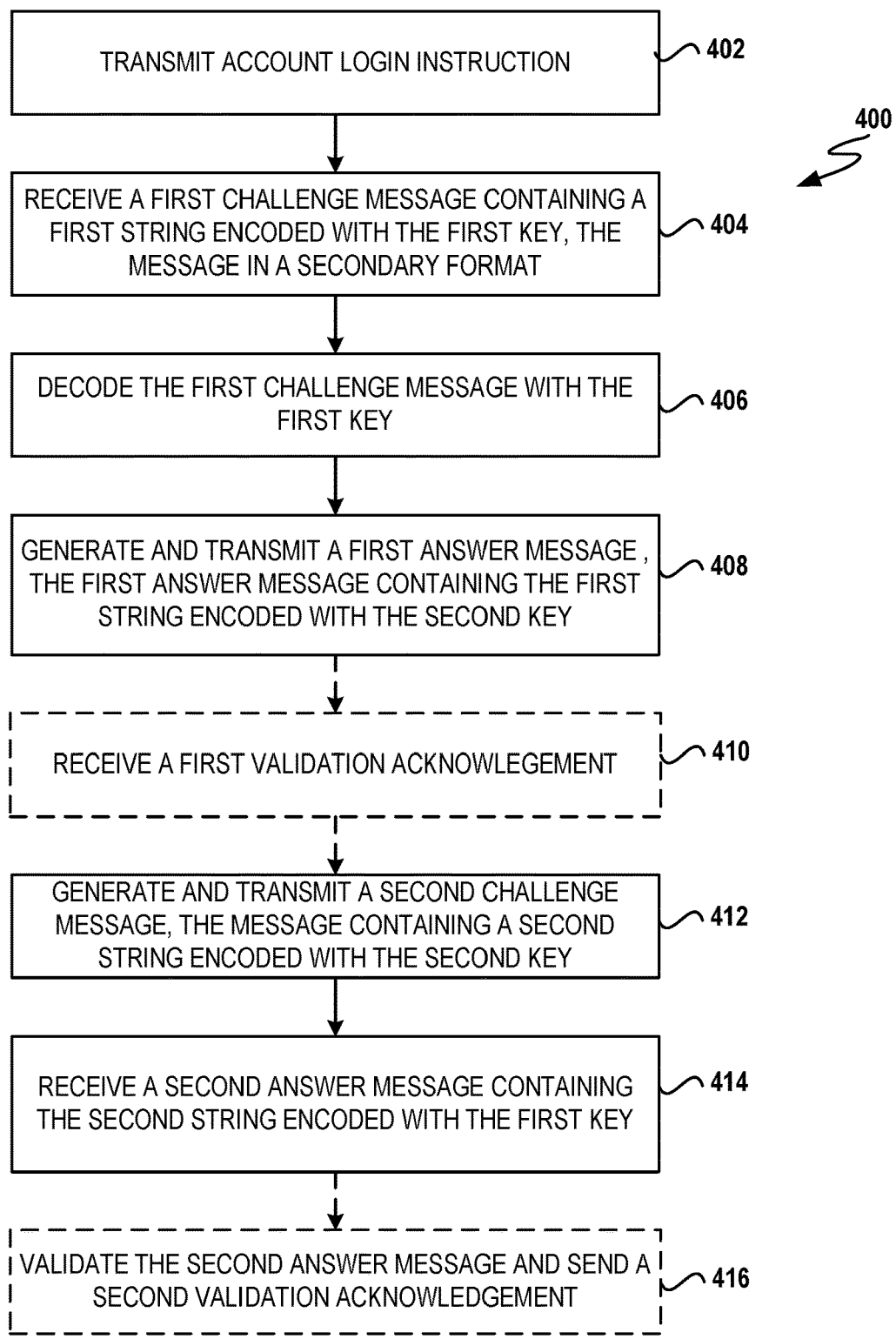
FIG. 4 depicts a flow diagram of example operations of a second device for symmetric account authentication, in accordance with embodiments of the present disclosure.

FIG. 4 depicts a flow diagram of example operations of a second device for symmetric account authentication, in accordance with embodiments of the present disclosure. In some embodiments, the second device may be a user device (e.g., user device 102). In such embodiments, the operations 300 of FIG. 3 illustrate the user device 102 side of the symmetric account authentication and thereby illustrate how user device 102 authenticates institution server 130.

Operations 400 begin at step 402 with user device 102 or a computing device transmitting an account login instruction. Before the user can access institution server 130's resources and services, the user has to login to their account through user device 102 or other computing device, and so user device 102 or other computing device generates an account login instruction to institution server 130. In some embodiments, user device 102 or other computing device transmits the account login instruction to institution server 130, and in other embodiments, user device 102 or other computing device transmits the account login instruction to authentication server 120, which in turn transmits the instruction to the institution server 130.

Once user device 102 or other computing device transmits the account login instruction to institution server 130, institution server 130 processes the instruction by generating a first challenge message and transmits this first challenge message to user device 102, such as using any of the methods discussed with respect to transmitting the keys at step 206 of FIG. 2. The first challenge message acts to authenticate user device 102 to the institution server 130. The process of generating the first challenge message was provided above with respect to FIG. 3.

At step 404, operations 400 continue with user device 102 receiving a first challenge message containing a first string encrypted with the first key, such as using any of the methods discussed with respect to transmitting the keys at step 206 of FIG. 2.

At step 406, operations 400 continue with user device 102 decoding the first challenge message with the first key. In one embodiment, user device 102 has no information on which key of the pair of keys generated during account creation to use to decrypt the first challenge message, so, user device 102 uses both keys to decrypt the first challenge. User device 102 then validates each result for the correctly-decrypted first challenge message, and because institution server 130 had encrypted the first challenge message with only one key of the pair of keys, user device 102 correctly decrypted one of the results and continues with the correctly-decrypted result. In some embodiment, user device 102 has information on which key to use to decrypt the first challenge message. Once user device 102 has decrypted the first challenge message, user device 102 extracts the first string from the first challenge message.

In some embodiments, user device 102 verifies the first string of the first challenge message to add an extra layer of authentication. User device 102 uses any of the methods discussed with respect to verifying the challenge message at step 314 of FIG. 3.

At step 408, operations 400 continue with user device 102 generating and transmitting a first answer message comprising the first string, encrypted with the second key such as via a network, the internet, text messaging, etc. With the extracted first string from the first challenge message, user device 102 generates an answer message with at least one instance of the first string, and user device 102 encrypts the first answer message with the second key. User device 102 transmits the encrypted first answer message to institution server 130, so that institution server 130 can validate the first answer message and thereby authenticate user device 102. In one embodiment, user device 102 encrypts the first answer message with the key not used for the first challenge message, so that responses from the user device 102 have a different encryption scheme compared to the message to the user device 102.

When user device 102 generates and transmits the first answer message, institution server 130 receives and validates the first answer message. If user device 102 has the correct copy of the first key and the second key, user device 102 should decrypt the first challenge message correctly and encrypt the first answer message correctly, so that when institution server 130 receives the first answer message, institution server 130 should decrypt the first answer message correctly and extract the same first string that institution server 130 used for the first challenge message from the first answer message. When institution server 130 decrypt the first answer message correctly and extracts the same first string that institution server 130 used for the first challenge message from the first answer message, institution server 130 has determined that user device 102 is authentic and has the correct credentials for the corresponding account and the user's personal information.

In some embodiments, at optional step 410, operations 400 continue with user device 102 receiving a first validation acknowledgement such as via a network, the internet, text messaging, etc. In some embodiment, user device 102 receives a first validation acknowledgement regardless of whether institution server 130 has authenticated user device 102. By providing a validation acknowledgement, the user of user device 102 knows whether institution server 130 has authenticated user device 102 to access institution server 130's services and resources. A validation acknowledgement can prompt user device 102 to perform other operations, based on the contents of the validation acknowledgement. For example, upon receiving a validation acknowledgement having information about institution server 130 successfully authenticating user device 102, user device 102 can initiate its own authentication of institution server 130.

At step 412, operations 400 continue with user device 102 generating and transmitting a second challenge message, comprising a second string, encrypted with the second key, such as via a network, the internet, text messaging, etc. In some embodiments, the second challenge message comprises a second string different from the first string. Like the first challenge message, the second challenge message can comprise multiple instances of the second string, any of which can be reverse versions of the second string. The second challenge message can also include information about its structure, including the number of instances of the second string, whether a particular instance of the second string is reversed, etc. In one embodiment, the second challenge message's structure comprises the following: <N1, #, $B_1$, $B_2$, ... $B_{N2}$, #, $S2_1$, $S2_2$, ..., $S2_{N2}$> where S2 represents the second string, N2 is the integer indicating the number of instances of the second string, "#" is a separator symbol, $B_1$ is a single bit indicating whether a particular instance the second string is reversed. Furthermore, the second string can comprise a sentence, which can be in any language. In some embodiments the second string is a grammatically correct sentence, and in some embodiments, the second string is a sentence retrieved from publically available information.

In some embodiments, user device 102 encrypts the second challenge message using the second key of the pair of keys. User device 102 can use the key not used by institution server 130 for encrypted the first challenge message to encrypt the second challenge message. In some embodiments, user device 102 uses the same key used for encrypting the first challenge message to encrypt the second challenge message, so that one key is always used for challenge messages while the other key of the pair of keys is used for the answer messages. In some embodiments, user device 102 encrypts the second challenge message with the second key using the XTEA algorithm, or any other block encrypting algorithm. By having a longer challenge message, user device 102 can provide more data for encryption and provide a more secure authentication process.

After generating the second challenge message, user device 102 transmits the second challenge message to institution server 130.

Institution server 130 receives the second challenge message from user device 102, and begins processing the second challenge message. Details about institution server 130 processing the second challenge message and transmitting a second answer message in response to the second challenge message to user device 102 are provided above with respect to FIG. 3.

At step 414, operations 400 continue with user device 102 receiving a second answer message comprising the second sentence encrypted with the first key, such as using any of the methods discussed with respect to transmitting the keys at step 206 of FIG. 2. Because authentic institution server 130 and authentic user device 102 have copies of the first and second keys, institution server 130 can decode the second challenge message and transmit a corresponding answer message containing the second string to decrypt with the first key. As mentioned, which key of the pair of keys can depend on the implementation of the symmetric authentication, and so user device 102 and institution server 130 can use any combination of keys for transmission of messages between each other.

In some embodiments, at optional step 416, operations 400 continue with user device 102 validating the second answer message and transmitting a second validation acknowledgement. As illustrated in FIG. 4, the dotted lines of step 416 represent that user device 102 can optionally perform step 416.

When user device 102 validates the second answer message, user device 102 decrypts the second answer message using the first key. If the results of decoding the second answer message with the first key match the second string used in generating the second challenge message, then user device 102 has determined that institution server 130 is authentic and does correspond to the correct institution, and has thereby completed its side of the symmetric authentication process.

In some embodiments, whether or not user device 102 has determined that institution server 130 is authentic, user device 102 transmits a second validation acknowledgement to institution server 130, such as via a network, the internet, text messaging, etc. The validation acknowledgement can include an acknowledgement message or any indication to institution server 130 about the results of user device 102's validation of the second answer message.

When institution server 130 receives the second validation acknowledgment from the user, both user device 102 and institution server 130 know that the other is authentic and they are symmetrically authenticated.

Figure 5:
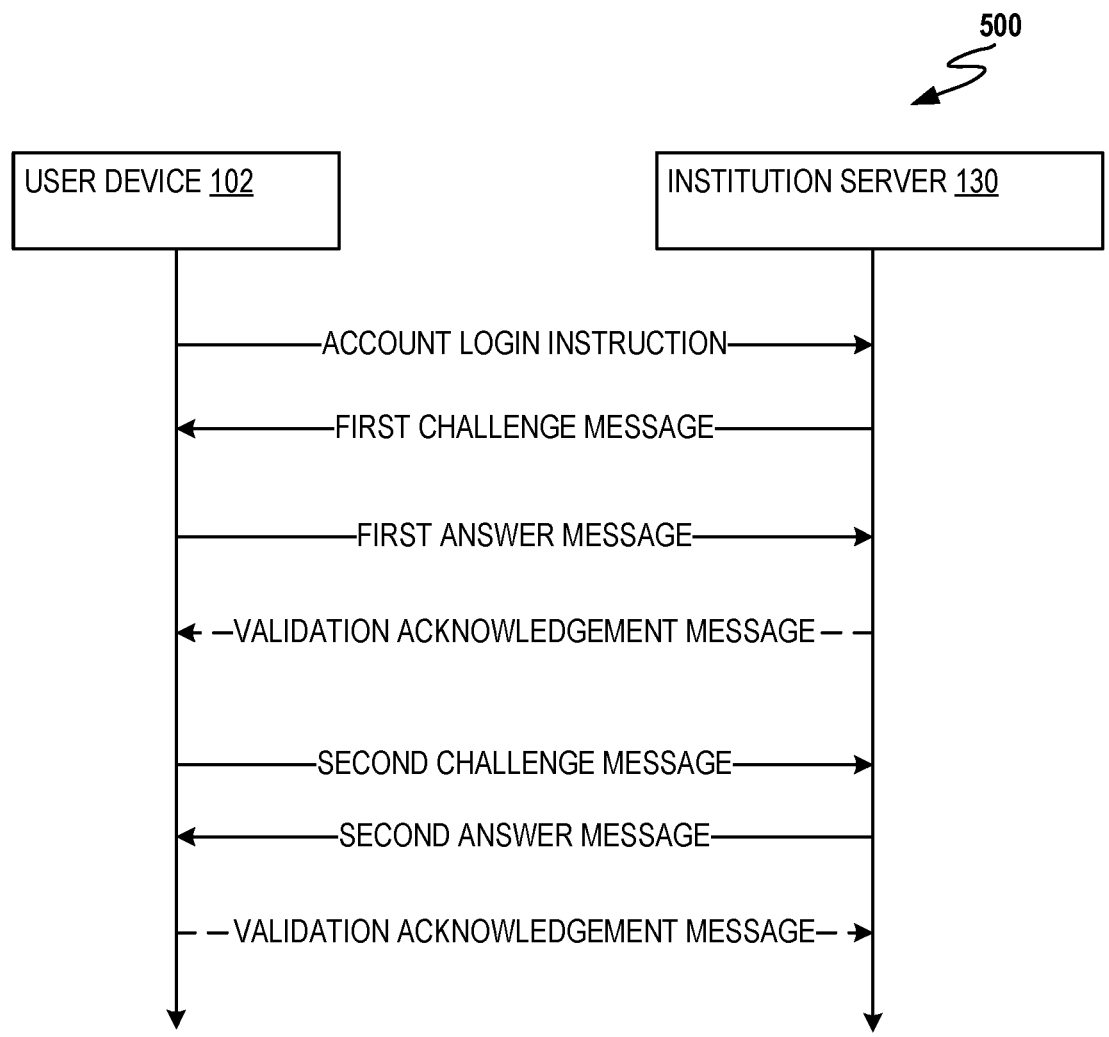
FIG. 5 depicts a sequence diagram of operations between a first device and a second device, in accordance with embodiments of the present disclosure.

FIG. 5 depicts a sequence diagram of operations between a first device and a second device, in accordance with embodiments of the present disclosure. In some embodiments, the first device may be an institution server (e.g., institution server 130) and the second device may be a user device (e.g., user device 102).

Sequence 500 begins with institution server 130 receiving an account login instruction from user device 102. In other embodiments, the account login is received from another computing device. This part of sequence 500 corresponds to step 302 of FIG. 3 and with step 402 of FIG. 4, in which user device 102 or other computing device transmits the account login instruction to institution server 130 and institution server 130 receives the account login instruction.

After institution server 130 receives the account login instruction, sequence 500 continues with institution server 130 transmitting the first challenge message to user device 102. This part of sequence 500 corresponds to step 304 of FIG. 3 and step 404 of FIG. 4, in which institution server 130 generates and transmits the first challenge message to user device 102 and user device 102 receives the first challenge message from the institution server 130.

After user device 102 receives the first challenge message from institution server 130, sequence 500 continues with user device 102 transmitting the first answer message to institution server 130. This part of the sequence 500 corresponds to step 306 of FIG. 3 and step 408 of FIG. 4, in which user device 102 generates and transmits the first answer message to institution server 130, and institution server 130 receives the first answer message from user device 102.

After institution server 130 receives the first answer message from user device 102, sequence 500 can optionally continue with institution server 130 transmitting the optional first validation acknowledgement to user device 102. This optional part of 500 is illustrated with dotted lines to show its optional nature, and corresponds to optional step 308 of FIG. 3 and step 410 of FIG. 4, in which institution server 130 generates and transmits the optional first validation acknowledgement, and user device 102 receives the optional first validation acknowledgement from institution server 130.

After user device 102 receives the optional first validation acknowledgement from institution server 130 sequences 500 continues with user device transmitting the second challenge message to institution server 130. This part of the sequence 500 corresponds to step 310 of FIG. 3 and step 412 of FIG. 4, in which the user device 102 generates and transmits the second challenge message to institution server 130, and institution server 130 receives the second challenge message from user device 102.

After institution server 130 receives the second challenge message from user device 102, sequence 500 continues with institution server 130 generating and transmitting the second answer message to user device 102. This part of the sequence 500 corresponds to step 316 of FIG. 3 and step 414 of FIG. 4, in which institution server 130 generates and transmits the second answer message to user device 102, and user device 102 receives the second answer message from institution server 130.

After user device receives the second answer message from institution server 130, sequence 500 can optionally continue with user device 102 transmitting a second validation acknowledgement to institution server 130. This optional part of 500 is illustrated with dotted lines to show its optional nature, and corresponds to step 318 of FIG. 3 and step 416 of FIG. 4, in which user device 102 generates and transmits the optional second validation acknowledgement and institution server 130 receives the optional second validation acknowledgement.

In some embodiments, the order of authentication between the user device 102 and institution server 130 can be reversed, in that user device 102 can authenticate institution server 130 before institution server 130 can authenticate user device 102.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for symmetric authentication by a first device, the method comprising:
   generating a first challenge message containing a first string, wherein generating the first challenge message comprises inserting multiple instances of the first string in the first challenge message and an indicator of a number of the multiple instances;
   encrypting the first challenge message;
   transmitting the encrypted first challenge message to a second device;
   receiving a first answer message from the second device;
   decrypting the first answer message;
   authenticating the second device based on determining the decrypted first answer message contains the first string;
   upon successful authentication of the second device, the method further comprises:
      receiving an encrypted second challenge message from the second device;
      decrypting the encrypted second challenge message;
      generating a second answer message containing a second string;
      encrypting the second answer message; and
      transmitting the encrypted second answer message to the second device.

2. The method of claim 1, wherein one or more of the multiple instances are reverse versions of the first string, wherein generating the first challenge message comprises inserting an indicator of which of the multiple instances are reverse versions.

3. The method of claim 1, wherein the first challenge message and second challenge message are encrypted using different keys.

4. The method of claim 1, wherein the second challenge message comprises the second string, wherein the second string comprises a sentence, and further comprising determining whether to generate the second answer message based on whether the sentence has proper grammar.

5. The method of claim 1, wherein receiving the first challenge message comprises capturing an image associated with the first challenge message displayed on a third device and converting the image to the first challenge message.

6. The method of claim 1, wherein upon failed authentication of the second device, the method further comprises:
   transmitting an acknowledgement of the failed authentication to the second device;
   generating a third challenge message containing a third string;
   encrypting the third challenge message;
   transmitting the third challenge message to the second device;
   receiving a third answer message from the second device;
   decrypting the third answer message; and
   authenticating the second device based on determining the decrypted third answer message contains the third string.

7. The method of claim 1, further comprising:
   receiving an acknowledgement of a failed authentication from the second device;
   receiving an encrypted third challenge message from the second device;
   decrypting the encrypted third challenge message;
   generating a third answer message containing a third string;
   encrypting the third answer message; and
   transmitting the encrypted third answer message to the second device.

8. The method of claim 1, further comprising:
   receiving an acknowledgement of successful authentication of the first device from the second device; and
   permitting the second device access to user information corresponding to the second device.

9. A system for symmetric authentication, the system comprising:
   a processor; and
   non-transitory computer-readable storage medium embodying computer program instructions for symmetric authentication by a first device, the computer program instructions implementing a method, the method comprising:
      generating a first challenge message containing a first string, wherein generating the first challenge message comprises inserting multiple instances of the first string in the first challenge message and an indicator of a number of the multiple instances;
      encrypting the first challenge message;
      transmitting the encrypted first challenge message to a second device;
      receiving a first answer message from the second device;
      decrypting the first answer message;
      authenticating the second device based on determining the decrypted first answer message contains the first string;
      upon successful authentication of the second device, the method further comprises:
         receiving an encrypted second challenge message from the second device;
         decrypting the encrypted second challenge message;
         generating a second answer message containing a second string;
         encrypting the second answer message; and
         transmitting the encrypted second answer message to the second device.

10. The system of claim 9, wherein the first challenge message and second challenge message are encrypted using different keys.

11. The system of claim 9, wherein receiving the first challenge message comprises capturing an image associated with the first challenge message displayed on a third device and converting the image to the first challenge message.

12. The system of claim 9, wherein upon failed authentication of the second device, the method further comprises:
   transmitting an acknowledgement of the failed authentication to the second device;
   generating a third challenge message containing a third string;
   encrypting the third challenge message;
   transmitting the third challenge message to the second device;
   receiving a third answer message from the second device;
   decrypting the third answer message; and authenticating the second device based on determining the decrypted third answer message contains the third string.

13. The system of claim 9, further comprising:
receiving an acknowledgement of a failed authentication from the second device;
receiving an encrypted third challenge message from the second device;
decrypting the encrypted third challenge message;
generating a third answer message containing a third string;
encrypting the third answer message; and
transmitting the encrypted third answer message to the second device.

14. The system of claim 9, further comprising:
receiving an acknowledgement of successful authentication of the first device from the second device; and
permitting the second device access to user information corresponding to the second device.

15. A non-transitory computer-readable storage medium embodying computer program instructions for symmetric authentication by a first device, the computer program instructions implementing a method, the method comprising:
generating a first challenge message containing a first string, wherein generating the first challenge message comprises inserting multiple instances of the first string in the first challenge message and an indicator of a number of the multiple instances;
encrypting the first challenge message;
transmitting the encrypted first challenge message to a second device;
receiving a first answer message from the second device;
decrypting the first answer message;
authenticating the second device based on determining the decrypted first answer message contains the first string;
upon successful authentication of the second device, the method further comprises:
receiving an encrypted second challenge message from the second device;
decrypting the encrypted second challenge message;
generating a second answer message containing a second string;
encrypting the second answer message; and
transmitting the encrypted second answer message to the second device.

16. The non-transitory computer-readable storage medium of claim 15, wherein the first challenge message and second challenge message are encrypted using the different keys.

17. The non-transitory computer-readable storage medium of claim 15, wherein receiving the first challenge message comprises capturing an image associated with the first challenge message displayed on a third device and converting the image to the first challenge message.

18. The non-transitory computer-readable storage medium of claim 15, wherein upon failed authentication of the second device, the method further comprises:
transmitting an acknowledgement of the failed authentication to the second device;
generating a third challenge message containing a third string;
encrypting the third challenge message;
transmitting the third challenge message to the second device;
receiving a third answer message from the second device;
decrypting the third answer message; and
authenticating the second device based on determining the decrypted third answer message contains the third string.

19. The non-transitory computer-readable storage medium of claim 15, further comprising:
receiving an acknowledgement of a failed authentication from the second device;
receiving an encrypted third challenge message from the second device;
decrypting the encrypted third challenge message;
generating a third answer message containing a third string;
encrypting the third answer message; and
transmitting the encrypted third answer message to the second device.

* * * * *